United States Patent [19]

Miyauchi

[11] Patent Number: 5,516,071
[45] Date of Patent: May 14, 1996

[54] SEAT SLIDE DEVICE WITH WALK-IN MECHANISM

[75] Inventor: Fumio Miyauchi, Ayase, Japan

[73] Assignee: Ikeda Bussan Co., Ltd., Ayase, Japan

[21] Appl. No.: 233,798

[22] Filed: Apr. 26, 1994

[30] Foreign Application Priority Data

Apr. 27, 1993 [JP] Japan ..................... 5-101283

[51] Int. Cl.⁶ .................................. F16M 13/00
[52] U.S. Cl. ..................... 248/429; 248/430; 297/331
[58] Field of Search ..................... 248/429, 419, 248/430, 421; 297/344.1, 331; 74/89.14, 424

[56] References Cited

U.S. PATENT DOCUMENTS

| | | | |
|---|---|---|---|
| 4,969,621 | 11/1990 | Münchow et al. | 248/429 |
| 5,150,872 | 9/1992 | Isomura | 248/429 |
| 5,242,144 | 9/1993 | Williams et al. | 248/429 |
| 5,259,257 | 11/1993 | Mouri | 74/89.15 |
| 5,273,242 | 12/1993 | Mouri et al. | 248/429 |
| 5,314,158 | 5/1994 | Mouri | 248/429 |
| 5,349,878 | 9/1994 | White et al. | 74/89.14 |

FOREIGN PATENT DOCUMENTS

| | | | |
|---|---|---|---|
| 0026137 | 2/1987 | Japan | 248/429 |
| 0026139 | 2/1987 | Japan | 248/429 |
| 0184939 | 8/1987 | Japan | 248/430 |
| 5-3387 | 1/1993 | Japan . | |

*Primary Examiner*—Ramon O. Ramirez
*Assistant Examiner*—Derek J. Berger
*Attorney, Agent, or Firm*—Foley & Lardner

[57] ABSTRACT

A seat slide device with a walk-in mechanism comprises a stationary guide rail fixed onto a floor panel and a slidable guide rail slidably fitted to the stationary guide rail for fore-aft position adjustment of a seat, a screw-threaded shaft member rotatably supported on one of the slidable guide rail and the stationary guide rail, and a nut member engaged with the screw-threaded shaft member for causing fore-aft motion of the slidable guide rail to the stationary guide rail through rotation of the screw-threaded shaft member. The walk-in mechanism includes a lock member being operable between a locked position to interlock the nut member to the other guide rail, and an unlocked position to permit a change of relative position of the nut member to the other guide rail. The lock plate is pivotally shifted between the locked position an the unlocked position by a control cable usually linked to a reclining lever.

5 Claims, 3 Drawing Sheets

SEAT SLIDE DEVICE WITH WALK-IN MECHANISM

BACKGROUND OF THE INVENTION

1. Field of the Invention

The present invention relates to a seat slide device which is optimally applied for an automotive vehicle, and specifically to a powered seat slide device with a walk-in mechanism by means of which a space necessary for getting on and out the car is satisfactorily obtained.

2. Description of the Prior Art

As is generally known, a conventional automotive seat slide device has a telescopically extendable guide rail structure for each side of the seat assembly. The telescopically extendable guide rail structure is interposed between the seat cushion and the floor panel of the car. The telescopically extendable guide rail structure is generally comprised of an upper slidable guide rail firmly secured to a respective side portion of the base plate of the seat and a lower stationary guide rail rigidly mounted on the floor panel. Recently, there have been proposed and developed various powered seat slide devices such as a motor-driven seat slide device. The powered seat slide device includes a guide rail driving unit consisting of a drive motor for example a DC motor and a gear box operably enclosed therein a worm and a worm wheel. The worm has a driven connection with a drive shaft of the motor, while the worm wheel has external threads put into meshed contact with the worm. The guide rail driving unit also includes a screw-threaded shaft rotatably supported by either one of the upper and lower guide rails through bearings at both ends of the one guide rail and a nut member being into threaded engagement with the screw-threaded shaft and fixed to the other guide rail. In general, the screw-threaded shaft has a driven connection with the drive motor through the worm gear box. Rotation of the screw-threaded shaft results in a relative sliding motion of the upper slidable guide rail to the lower stationary guide rail. Thus, the fore-aft position adjustment of the seat is achieved. On more earlier cars, the powered seat slide device employs a so-called walk-in mechanism which is mechanically linked to the slidable upper rail so that the upper rail is interlocked to the lower rail with the walk-in mechanism conditioned in its locked position. In contrast, when the walk-in mechanism is conditioned in an unlocked state, the upper rail is free from the lower rail, so as to permit a relative sliding motion of the upper rail to the lower rail. In two-door type vehicles, the walk-in mechanism usually cooperates with a reclining device in order to ensure a wider space necessary for getting on and out the car through pulling operation of a reclining lever. One such conventional powered seat slide device with a walk-in mechanism has been disclosed in Japanese Second Publication (Tokko Heisei) No. 5-3387.

The powered seat slide device with a walk-in mechanism disclosed in the Japanese Second Publication No. 5-3387 includes an upper slidable guide rail having a C-channel in cross-section, a lower stationary guide rail having a C-channel in cross-section, and a H-shaped intermediate slidable guide rail. The openings of C-channeled upper and lower guide rails oppose to each other, such that two parallel flat rail sections are slidably accommodated in internal spaces defined in the two opposing C-channeled rails. A screw-threaded shaft is rotatably supported by the intermediate guide rail at both ends thereof, while a nut member which is in threaded contact with the screw-threaded shaft is fixed onto the lower stationary guide rail. The screw-threaded shaft has a driven connection with a drive motor in a conventional manner. Therefore, rotation of the screw-threaded shaft results in a relative sliding motion of the intermediate guide rail to the lower guide rail. In the prior-art powered seat slide device described in the Japanese Second Publication No. 5-3387, a walk-in mechanism is provided between the upper slidable guide rail and the intermediate slidable guide rail, in such a manner as to interlock the upper guide rail to the intermediate guide rail. The walk-in mechanism comprises an engaging slot formed in the intermediate guide rail, a locking nail which is arranged on the upper rail so that the locking nail is inserted through a slot formed in the side wall of the upper rail into the engaging slot of the intermediate rail at a predetermined relative position between the upper and intermediate rails, for the purpose of the above-noted interlocking. With the locking nail positioned out of the engaging slot, the upper rail is free from the intermediate rail, while the sliding motion of the intermediate rail to the lower rail is restricted by way of threaded-engagement between the screw-threaded shaft and the nut member. Thus, the upper rail, i.e., the seat cushion can be rapidly moved at the most forward position in the unlocked state of the walk-in mechanism, thereby facilitating getting on and out the car. However, such an intermediate guide rail increases the number of parts of a powered seat slide assembly. Production costs of the powered seat slide assembly may be increased. In addition, the intermediate rail never contributes to lightening of a powered seat sliding device for automotive vehicles. In the above-mentioned prior art, since the additional intermediate guide rail is incorporated into the upper and lower guide rails and the walk-in mechanism is arranged between upper and intermediate rails to mechanically interlock these rails together, the two engaging slots must be machined on the side walls of the upper and intermediate rails. This results in slight reduction of rigidity of the guide rail assembly.

SUMMARY OF THE INVENTION

Accordingly, it is an object of the present invention to provide an improved seat slide device with a walk-in mechanism which avoids the foregoing disadvantages of the prior art.

It is another object of the invention to provide a lightweight and high-rigidity powered seat slide device with a walk-in mechanism.

In order to accomplish the aforementioned and other objects of the invention, a seat slide device with a walk-in mechanism comprises at least one pair of guide rail units for slidably supporting a seat for fore-aft position adjustment of the seat, each guide rail unit having a stationary guide rail fixed onto a floor and a slidable guide rail slidably fitted to the stationary guide rail and attached onto a bottom of the seat, a driving mechanism arranged for causing fore-aft motion of the slidable guide rail to the stationary guide rail, the driving mechanism including a screw-threaded shaft member rotatably supported on one of the stationary guide rail and the slidable guide rail at both ends thereof and a nut member being in threaded engagement with the screw-threaded shaft member, the walk-in mechanism including locking means being operable between a locked position wherein the nut member engages with the other guide rail by interlocking the nut member to the other guide rail, and an unlocked position wherein the nut member disengages from the other guide rail to permit a change of relative position of the nut member to the other guide rail, and operating means associated with the locking means for switching the locking means from one of the locked and unlocked positions to the other. It is preferable that the locking means includes a high-rigidity lock member having a nail portion and a high-rigidity nut holder fitted onto the nut member. The nut holder is formed with a slot which is engaged with the nail portion at the locked position to assure interlocking between the nut member and the other guide rail and disengaged from the nail portion at the unlocked position to permit the change of relative position of the nut member to the other guide rail. The lock member is pivotally supported on the other guide rail and preloaded towards the locked position, and the lock member has a cam portion through which the lock member is cam-operated from the locked position to the unlocked position by a backward sliding movement of the slidable guide rail relative to the stationary guide rail. The operating means includes a control cable and the lock member is rotated towards the unlocked position by pulling the control cable.

According to another aspect of the invention, a powered seat slide device with a walk-in mechanism comprises at least one pair of guide rail units for slidably supporting a seat for fore-aft position adjustment of the seat, each guide rail unit having a lower stationary guide rail fixed onto a floor and an upper slidable guide rail slidably fitted to the lower stationary guide rail and attached onto a bottom of the seat, a driving mechanism arranged for causing fore-aft motion of the upper slidable guide rail to the lower stationary guide rail, the driving mechanism including a longitudinally extending screw-threaded shaft member rotatably supported on one of the lower stationary guide rail and the upper slidable guide rail at both ends thereof and a nut member being in threaded engagement with the screw-threaded shaft member, a drive motor attached to the one guide rail and having a driving connection with the screw-threaded shaft member, the walk-in mechanism including locking means being operable between a locked position wherein the nut member engages with the other guide rail by interlocking the nut member to the other guide rail at a predetermined position of the nut member relative to the other guide rail, and an unlocked position wherein the nut member disengages from the other guide rail to permit a change of relative position of the nut member to the other guide rail, and operating means associated with the locking means for switching the locking means from one of the locked and unlocked positions to the other.

According to a further aspect of the invention, a powered seat slide device with a walk-in mechanism comprises at least one pair of guide rail units for slidably supporting a seat for fore-aft position adjustment of the seat, each guide rail unit having a lower stationary guide rail fixed onto a floor and an upper slidable guide rail slidably fitted to the lower stationary guide rail and attached onto a bottom of the seat, a driving mechanism arranged for causing fore-aft motion of the upper slidable guide rail to the lower stationary guide rail, the driving mechanism including a longitudinally extending screw-threaded shaft member rotatably supported on the upper slidable guide rail at both ends thereof and a nut member being in threaded engagement with the screw-threaded shaft member, a drive motor attached to the upper slidable guide rail and having a driving connection with the screw-threaded shaft member, the walk-in mechanism including a pivotal lock member being operable between a locked position wherein the nut member engages with the lower stationary guide rail by interlocking the nut member to the lower stationary guide rail at a predetermined position of the nut member relative to the lower stationary guide rail to permit the fore-aft motion of the upper slidable guide rail to the lower stationary guide rail through rotation of the screw-threaded shaft member, and an unlocked position wherein the nut member disengages from the lower stationary guide rail to permit a forward sliding motion of the upper slidable guide rail along with the nut member; the lock member having a nail portion, a nut holder fitted onto the nut member and formed with a slot which slot is engaged with the nail portion at the locked position to assure interlocking between the nut member and the lower stationary guide rail and disengaged from the nail portion at the unlocked position to permit the change of relative position of the nut member to the lower stationary guide rail, and a control cable connected to the lock member at one end thereof for switching the lock member from one of the locked and unlocked positions to the other through a pivotal motion of the lock member. The nut holder consists of a bottom wall and four side walls. The nut holder has the slot at the bottom wall thereof, and the lower stationary guide rail has a slot just overlapping with the slot of the nut holder at the predetermined position of the nut member, and the nut member and the lower stationary guide rails are interlocked to each other by inserting the nail portion into both the slot of the lower guide rail and the slot of the nut holder.

DESCRIPTION OF THE PREFERRED EMBODIMENTS

Figure 1:
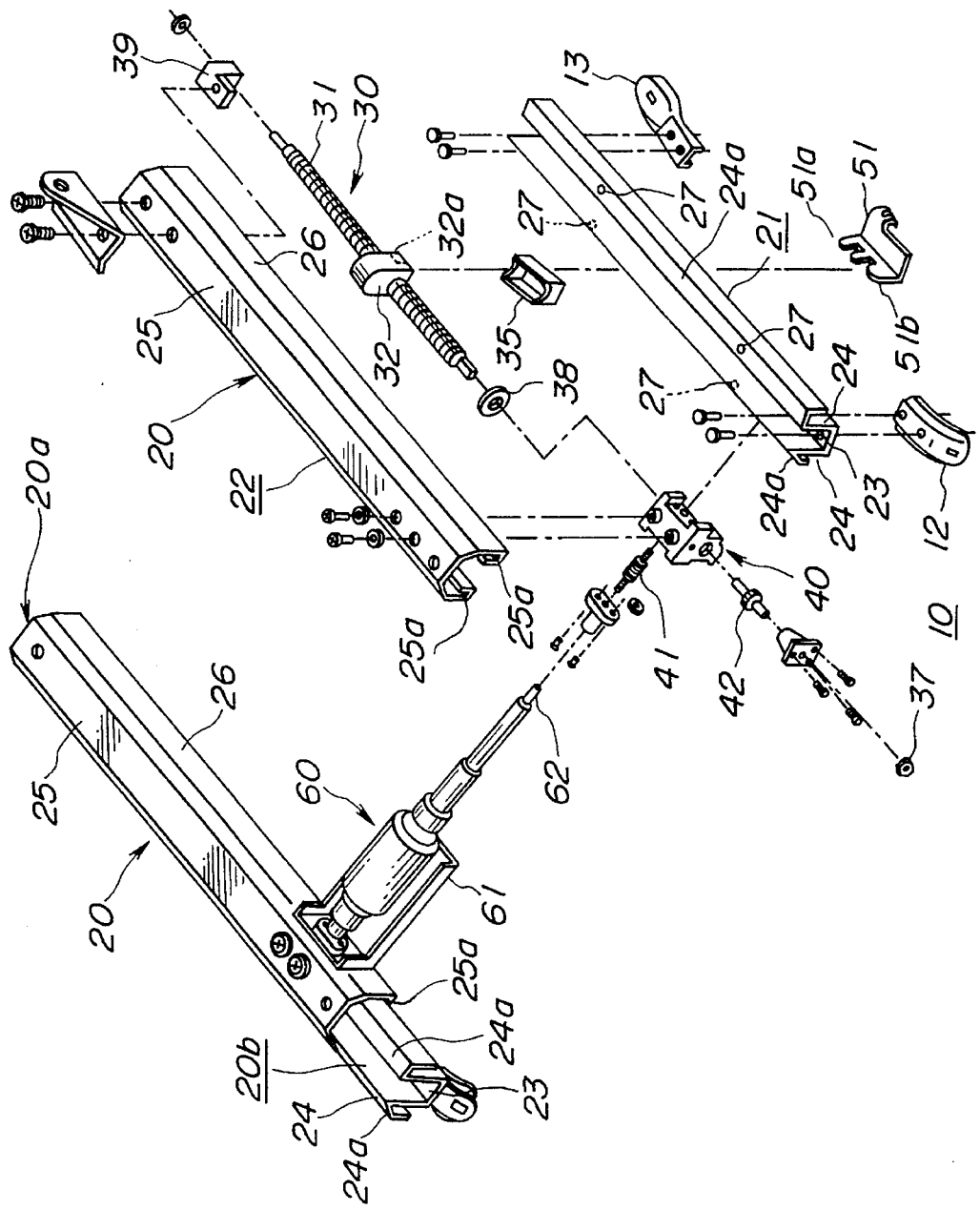
FIG. 1 is an exploded perspective view illustrating one embodiment of a powered seat slide device according to the invention.
Figure 3:
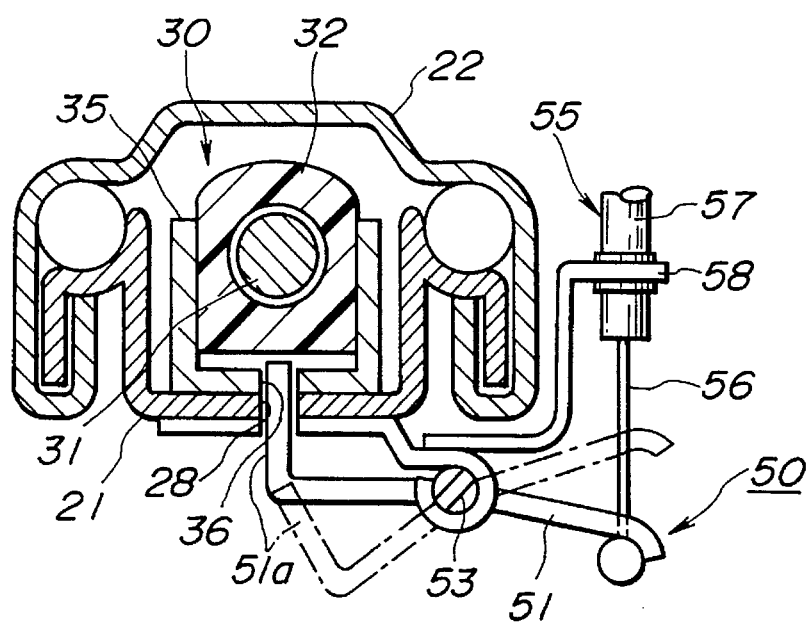
FIG. 3 is a lateral cross-sectional view taken in the direction of the arrow A shown in FIG. 2.

Referring now to the drawings, particularly to FIG. 1, the seat slide device with the walk-in mechanism according to the invention is exemplified in case of a powered seat of an automotive vehicle, such as an automobile powered seat having a reclining back. As seen in FIG. 1, the seat (not shown) is mounted on the floor panel 10 of the vehicle body through the powered seat slide device 20a of the embodiment, for-the purpose of the fore and aft position adjustment of the seat in relation to the floor. The powered seat slide device 20a includes a pair of telescopically extendable guide rail units 20 respectively provided on both sides of the bottom surface of the seat cushion (not shown) and extending forwardly and backwardly of the seat. Each guide rail unit 20 consists of a lower stationary guide rail 21 rigidly mounted on the floor panel 10 through front and rear brackets 12 and 13 by way of fasteners such as fastening bolts, rivets or the like, and an upper slidable guide rail 22 firmly secured onto the side portion of the bottom surface of the seat cushion by means of fasteners such as fastening bolts, rivets or the like. The upper guide rail 22 is slidably fitted to the lower guide rail 21, to permit a fore and aft sliding movement of the upper guide rail to the lower guide rail. As seen in FIG. 1, the floor-panel side lower stationary guide rail 21 of a reversed hat shape includes a bottom wall section 23 and a pair of side wall sections 24 having a bent portion 24a at the upper end thereof. On the other hand, the seat-cushion side upper slidable guide rail 22 includes a ceiling section 25 and a pair of side wall sections 26 having a bent portion 25a at the lower end thereof in such a manner as to slidably enclose the upper bent portion 24a of the lower stationary guide rail 21 by the lower bent portion 25a of the upper slidable guide rail 22. With the two rails 21 and 22 fitted to each other, an aperture 20b is defined by the bottom wall section 23 and the side wall sections 24 and the ceiling wall section 25 and the side wall sections 26. As shown in FIG. 3, the two engaging pair of side wall sections 24 and 26 cooperates to operably accommodate ball bearings 27. As appreciated from FIGS. 1 and 3, the semi-circular recessed portions formed on the upper bent portions of the lower guide rail 21 function as a bearing carrier. Friction owing to the sliding-contact between the two engaging pair is effectively reduced with the aid of the ball bearings 27. As seen in FIG. 1, a driving mechanism 30 is disposed in the aperture 20b, to cause a relative sliding movement of the upper rail 22 to the lower rail 21. The driving mechanism 30 includes a screw-threaded shaft 31 extending in a longitudinal direction of the guide rail and a nut member 32 engaged with the screw-threaded shaft 31.

In the embodiment, a gear box 40 is disposed in the front of the aperture 20b of the left-hand side guide rail unit 20 (viewing FIG. 1). The gear box 40 is firmly secured onto the ceiling wall section 25 of the upper guide rail 22 by means of spring washers and bolts. The gear box 40 has a worm 41 and a worm wheel 42, both rotatably accommodated therein so that the worm wheel 42 is in meshed engagement with the worm 41. The rear end of the screw-threaded shaft member 31 is rotatably supported on the ceiling wall section 25 by way of a bearing 39, while the front end shaft portion of the screw-threaded shaft member 31 is firmly fitted into the center bore of the worm wheel 42 for co-rotation with the worm wheel. To avoid fore-aft axial movement of the screw-threaded shaft 31, a pair of nuts 37 are screwed into the front and rear ends of the screw-threaded shaft 31, as seen in FIG. 1. A ring washer type stopper 38 is loosely fitted onto the front section of the screw-threaded shaft member 31, so as to certainly prevent forward axial movement of the member 31 towards the gear box. A drive motor 60 is attached onto the side wall section 26 of the upper guide rail 22 of the right-hand side guide rail unit 20 through a supporting bracket 61. The drive shaft 62 of the motor 60 is connected to the input shaft of the worm 41. Thus, when the motor is activated and the output shaft 62 is driven, the driving torque is transmitted from the worm 41 through the worm wheel 42 to the screw-threaded shaft 31. The previously-noted arrangement of the powered seat slide device is well known.

The powered seat slide device according to the invention also includes a walk-in mechanism 50 associated with the nut member 32, as hereinbelow described in detail.

Figure 4:
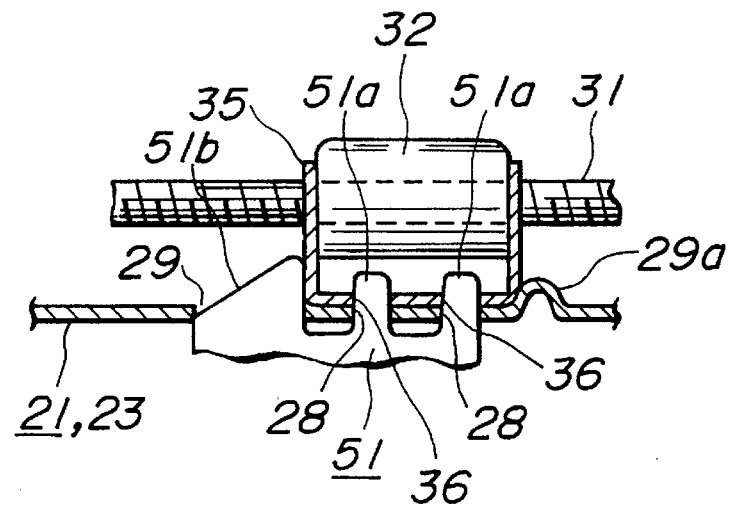
FIG. 4 is a side view showing a locked state of the walk-in mechanism.
Figure 5:
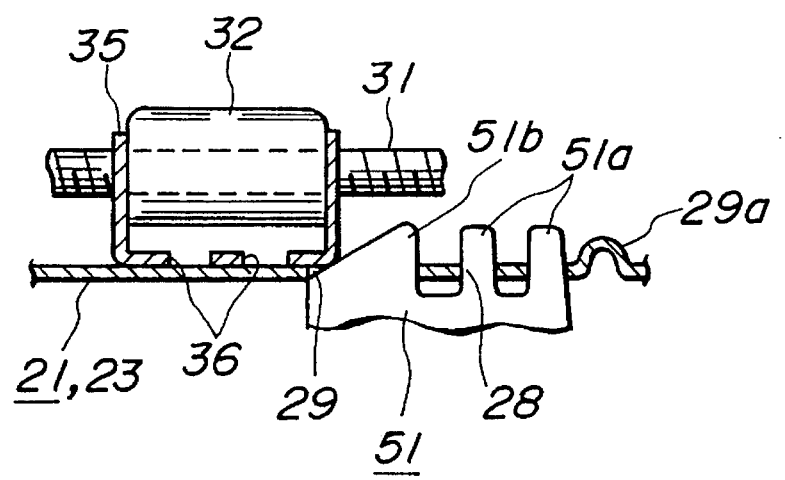
FIG. 5 is a side view showing an unlocked state of the walk-in mechanism.

Referring now to FIGS. 3–5, the walk-in mechanism 50 of the embodiment includes a substantially box-shaped nut holder 35 associated with the nut member 32. The nut member 32 is received in the box-shaped nut holder 35 having an upper rectangular opening so that the nut member 32 is fitted into the nut holder 35 through the upper rectangular opening. Fitting relationship between the four outside walls of the nut member 32 and the four inside walls of the nut holder 35 is designed to be transition fit or interference fit, to prevent rattling between the nut member 32 and the nut holder 35. The nut holder 35 has a rectangular bottom wall section in addition to the four side wall sections. The bottom wall section of the nut holder 35 is slidably arranged on the bottom wall 23 of the lower guide rail 21 in such a manner as to be in contact with the inside wall surface of the bottom wall 23 through loose fit or clearance fit. The above-mentioned fit between the two bottom wall surfaces prevents rotation of the nut member 32 about the screw-threaded shaft member 31. As appreciated from FIG. 4, the forward movement of the nut member 31 itself is restricted by the front side wall of the nut holder 35 fitted to the nut member 32, while the backward movement of the nut member 32 is restricted by the rear side wall of the nut holder 35. As seen in FIGS. 3 through 5, the nut holder 35 has two slots 36 longitudinally aligned to each other at the bottom wall thereof. On the other hand, the lower guide rail 21 of the left-hand side rail unit 20 has two slots 28 and an elongated slot 29 in the front of the two slots 28. The slots 28 and the slot 29 are longitudinally aligned to each other in respect to the lower guide rail 21. The lower guide rail 21 also has a projection 29a which is brought into collision-contact with the rear end or the rear side wall of the nut holder 35. The collision-contact between the projection 29a and the nut holder 35 certainly prevents a further backward movement of the nut holder 35. That is, the projection formed on the lower guide rail 21 serves as a stopper for the nut holder 35. The position relation between the respective slots 28 and 36 is so designed that the two slots 28 of the lower guide rail 21 are completely overlapped with the two slots 36 of the nut holder 35, with the nut member 32 brought into contact with the projection 29a of the lower rail 21.

Figure 2:
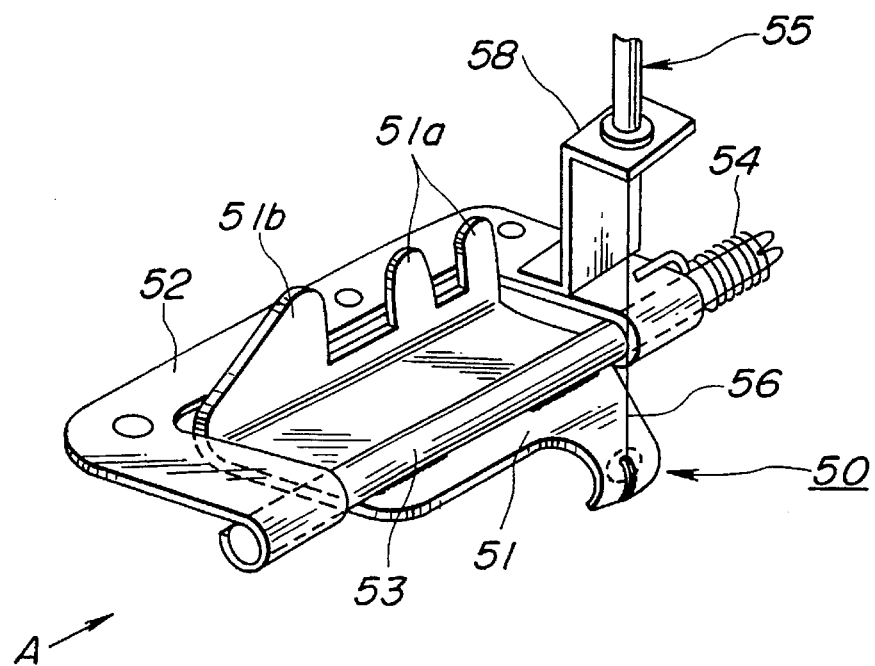
FIG. 2 is a perspective view illustrating a walk-in mechanism employed in the powered seat slide device of FIG. 1.

Referring to FIGS. 2 and 3, the walk-in mechanism 50 also includes a lock member 51 and a control cable 55. The lock member 51 is pivotably supported by a support plate 52 which is fixed to the bottom wall 23 of the lower guide rail 21 by riveting. As seen in FIG. 2, the lock member 51 is rigidly connected to a pivot shaft 53 by welding. Actually, the pivot shaft 53 is pivotably supported by the support plate 52. The lock member 51 is preloaded in the clockwise direction (viewing in the direction of the arrow A of FIG. 2) by means of a return spring 54 such as a torsion spring. The lock member 51 includes two locking nail portions 51a and a substantially tri-angular cam portion 51b. The two locking nail portions 51a and the cam portion 51b are dimensioned so that each nail portion 51a is fitted and inserted through the corresponding slots 28 and 36 overlapped to each other and the cam portion 51b is fitted and inserted into the elongated slot 29 of the lower rail 21 through the clockwise rotation of the lock member 51, under the contacting condition of the nut holder 35 with the projection 29a. The cam portion 51b has a moderately sloped cam surface which is up-sloped towards the rear of the cam portion 51b. One connection end of an inner wire 56 of the control cable 55 is firmly connected to the other side facing apart from the nail side of the lock member 51. As shown in FIG. 3, the control cable 55 has an outer tubular casing 57. One end of the outer casing 57 is supported on the support plate 52 through a bracket 58, while the other end of the outer casing 57 is connected to a reclining mechanism (not shown). The other connection end of the inner wire 56 is usually linked to a reclining lever (not shown) of the reclining mechanism in a conventional manner. With the above arrangement, the walk-in mechanism of the powered seat slide device operates as follows.

As shown in FIG. 4, in the event that the lock member 51 of the walk-in mechanism 50 is conditioned in a locked position, the locking nail portions 51a engage with the slots 36 of the nut holder 35. As a result, the nut member 32 is interlocked to the lower stationary guide rail 21 by means of the nut holder 35 at a predetermined position in which the nut holder 35 is in contact with the projection 29a of the lower rail 21. In this case, the relative fore-aft movement of the upper rail 22 to the lower rail 21 is prevented by way of threaded engagement between the screw-threaded shaft member 31 and the nut member 32, with the result that the fore-aft motion of the seat is also prevented. Under this condition, assuming that the drive motor 60 is activated, the screw-threaded shaft member 31 is rotated. Since the screw-threaded shaft member 31 is coupled with the nut member 32 through threaded engagement and the nut member 32 is interlocked to the lower stationary rail 21, rotation of the screw-threaded shaft member 31 causes a forward axial movement or backward axial movement of the screw-threaded shaft member 31 to the nut member 32, depending on the rotational direction thereof. Thus, the upper rail 22 can move forwards or backwards in accordance with rotation of the screw-threaded shaft member 31 under the locked state of the walk-in mechanism 50. In this manner, the fore-aft position adjustment of the seat can be achieved. In the locked position of the lock member 51, the lock member 51 and the nut holder 35 both have a sufficiently high rigidity, in order that the lock member 51 provides a reliable interlocking between the nut member 32 and the lower rail 21 in cooperation with the nut holder 35. Since the nut holder 35 is small-sized to a minimum possible size enough to hold the nut member 32, the entire weight of the powered seat slide device with the walk-in mechanism can be minimized.

Subsequently to the above, when the inner wire 56 of the control cable 55 is pulled by pulling the reclining lever (not shown) of the reclining mechanism (not shown), the lock member 51 shifts from the locked position shown in the solid line of FIG. 3 to the unlocked position shown in the phantom line of FIG. 3 against the bias of the spring 54, with the result that the nut holder 35, i.e., the nut member 32 becomes free from the lower rail 21. Under the unlocked condition of the walk-in mechanism, the nut member 32 is movable forwards together with the upper rail 22 as seen in FIG. 5, while retaining engaged with the screw-threaded shaft member 31. In conventional powered seat slide devices with a walk-in mechanism, since a return spring (not shown) is ordinarily provided for producing easier forward motion of the upper rail to the lower rail, the upper rail 22 shifts to the most forward position during operation of the walk-in mechanism. In this manner, the walk-in mechanism 50 performs an effective walk-in operation in which a wider space is obtained at the back of the seat. As appreciated from the above, since the walk-in operation of the walk-in mechanism according to the invention is not electronically achieved by an electric motor for example, but mechanically achieved by the previously-described mechanical linkage, a high safety of the system can be obtained. Under the condition wherein the seat, i.e., the upper rail 22 shifts to the most forward position, the lock member 51 is held in the spring-set position wherein the respective nail portions 51a are held engaged with the slots 28 of the lower rail 21 through the spring-bias. After the walk-in operation, when the seat is returned backwards, the screw-threaded shaft member 31 mounted on the upper rail 22 is shifted backwards along with both the nut member 32 and the nut holder 35. In accordance with the backward movement of the nut member 32, the rear end of the nut holder 35 comes into contact with the front end of the sloped cam portion 51b of the lock member 51. Then, the nut holder 35 moves backwards in parallel with the bottom wall 23 of the lower rail 22, while engaging with the sloped cam surface of the cam portion 51b. Therefore, the lock member 51 is cam-operated to be rotated anti-clockwise against the bias of the spring 54.

As a result, the lock member 51 is pivotally shifted from the locked position (spring-set position) illustrated in the solid line of FIG. 3 to the unlocked position illustrated in the phantom line of FIG. 3. The above-pivotal movement of the lock member 51 owing to the cam operation permits a further backward movement of the nut holder 35 and the nut member 32. The further backward movement is continued until the rear end of the nut holder 35 comes into contact with the projection 29a of the lower rail 21. Since the two slots 36 just overlap with the two slots 28 at the predetermined position of the nut member 32 wherein the rear end of the nut holder 35 is brought into contact with the projection 29a, the two nail portions 51a of the lock member 51 engage with the two slots 36 through the two slots 28 with the aid of the bias of the spring 54, as shown in FIG. 4. Accordingly, the walk-in mechanism 50 is conditioned in the locked state. In this manner, the nut member 32 is interlocked again to the lower stationary guide rail 21 at the above-noted predetermined position.

As will be appreciated from the above, since the nut member 32 is interlocked through the high-rigidity and small-sized nut holder 35 to the lower guide rail 21 with the aid of the lock member 51, the walk-in mechanism itself is small-sized. In the preferred embodiment, although the nut member 32 is interlocked to the lower rail 21 through an intermediate member, i.e., the nut holder 35, the nut member 32 may include engaging slots at the bottom thereof so that the nut member is directly interlocked by the lock member 51 through engagement between the nail portions 51a and the engaging slots, without providing the nut holder 35. In this case, the nut member 32 must be dimensioned to be in sliding-contact with the bottom wall of the lower rail 21 at the bottom 32a thereof in such a manner as to prevent rotation thereof about the axis of the screw-threaded shaft member 31.

Moreover, in the embodiment, the driving unit having the drive motor and the screw-threaded shaft member 31 of the driving mechanism are attached to the upper slidable rail 22 and the nut member 32 is interlockable to the lower rail 21 through the lock member 51 attached to the lower rail 21. In lieu of the above, the drive unit and the screw-threaded shaft member 31 may be attached to the lower stationary guide rail 21 and the nut member 32 may be interlockable to the upper slidable guide rail 22 through the lock member 51 attached to the upper rail 22, to provide the same walk-in operation as set forth above. In the latter case, the fore-aft sliding movement of the upper rail 22 to the lower rail 21 is prevented by threaded engagement between the nut member 32 and the screw-threaded shaft member 31 under the locked condition of the walk-in mechanism in which the nut member 32 is interlocked to the upper slidable rail 22 through the lock member 51. Under this condition, if the motor is driven to rotate the screw-threaded shaft member 31, the nut member 32 interlocked to the upper rail 22 moves together with the upper rail 22 owing to rotation of the screw-threaded shaft member 31, with the result that the fore-aft adjustment of the seat can be achieved. Under the unlocked condition of the walk-in mechanism in which the nut member 32 is free from the upper rail 22, only the upper rail 22 is movable in the longitudinal direction to assure the walk-in operation.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A seat slide device with a walk-in mechanism, comprising:

at least one pair of guide rail units for slidably supporting a seat for fore-aft position adjustment of the seat, each guide rail unit having a stationary guide rail fixed onto a floor and a slidable guide rail slidably fitted to said stationary guide rail;

a driving mechanism arranged for causing fore-aft motion of said slidable guide rail to said stationary guide rail, said driving mechanism including a screw-threaded shaft member rotatably supported at both ends thereof on a first guide rail, said first guide rail being one guide rail of said stationary guide rail and said slidable guide rail, and a nut member being in threaded engagement with said screw-threaded shaft member;

said walk-in mechanism including;

locking means being operable between a locked position wherein said nut member engages with a second guide rail, said second guide rail being the other guide rail of said stationary guide rail and said slidable guide rail, by interlocking said nut member to the second guide rail, and an unlocked position wherein said nut member disengages from the second guide rail to permit a change of relative position of said nut member to the second guide rail; and operating meads associated with said locking means for switching said locking means from one of said locked and unlocked positions to the other, wherein said locking means includes a high-rigidity lock member having a nail portion and a high-rigidity nut holder fitted onto said nut member, said nut holder being formed with a slot which is engaged with said nail portion at said locked position to assure interlocking between said nut member and the second guide rail and disengaged from said nail portion at said unlocked position to permit the change of relative position of said nut member to the second guide rail.

2. The seat slide device as set forth in claim 1, wherein said lock member is pivotally supported on the second guide rail and preloaded towards the locked position, and said lock member has a cam portion through which said lock member is cam-operated from the locked position to the unlocked position by a backward sliding movement of said slidable guide rail relative to said stationary guide rail.

3. The seat slide device as set forth in claim 2, wherein said operating means includes a control cable and said lock member is rotated towards the unlocked position by pulling said control cable.

4. A powered seat slide device with a walk-in mechanism comprising:

at least one pair of guide rail units for slidably supporting a seat for fore-aft position adjustment of the seat, each guide rail unit having a lower stationary guide rail fixed onto a floor and an upper slidable guide rail slidably fitted to said lower stationary guide rail;

a driving mechanism arranged for causing fore-aft motion of said upper slidable guide rail to said lower stationary guide rail, said driving mechanism including a longitudinally extending screw-threaded shaft member rotatably supported at both ends thereof on said upper slidable guide rail and a nut member being in threaded engagement with said screw-threaded shaft member;

a drive motor attached to said upper slidable guide rail and having a driving connection with said screw-threaded shaft member;

said walk-in mechanism including:

a pivotal lock member being operable between a locked position wherein said nut member engages with said lower stationary guide rail by interlocking said nut member to said lower stationary guide rail at a predetermined position of said nut member relative to said lower stationary guide rail to permit the fore-aft motion of said upper slidable guide rail to said lower stationary guide rail through rotation of said screw-threaded shaft member, and an unlocked position wherein said nut member disengages from said lower stationary guide rail to permit a forward sliding motion of said upper slidable guide rail along with said nut member; said lock member having a nail portion;

a nut holder fitted onto said nut member and formed with a slot which is engaged with said nail portion at said locked position to assure interlocking between said nut member and said lower stationary guide rail and disengaged from said nail portion at said unlocked position to permit the forward sliding motion of said nut member to said lower stationary guide rail; and a control cable connected to said lock member at one end thereof for switching said lock member from one of said locked and unlocked positions to the other through a pivotal motion of said lock member.

5. The powered seat slide device as set forth in claim 4, wherein said nut holder consists of a bottom wall and four side walls, and said nut holder has said slot at the bottom wall thereof, and said lower stationary guide rail has a slot just overlapping with said slot of said nut holder at said predetermined position of said nut member, and said nut member and said lower stationary guide rails are interlocked to each other by inserting said nail portion into both said slot of said lower guide rail and said slot of said nut holder.

* * * * *